United States Patent [19]

Molina

[11] 4,433,459
[45] Feb. 28, 1984

[54] HIGH STRENGTH PUSH TYPE FASTENER

[75] Inventor: Jorge W. Molina, Torrance, Calif.

[73] Assignee: Deutsch Fastener Corp., El Segundo, Calif.

[21] Appl. No.: 381,553

[22] Filed: May 24, 1982

[51] Int. Cl.³ .................. F16B 19/00; A44B 17/00
[52] U.S. Cl. ............................... 24/613; 24/633; 411/352
[58] Field of Search .............. 24/208 R, 211 R, 216, 24/217 R, 221 K, 208 A, 211 P, 219, 210; 411/360, 352; 403/408

[56] References Cited

U.S. PATENT DOCUMENTS

| | | | |
|---|---|---|---|
| 2,252,286 | 8/1941 | Hathorn | 24/221 K |
| 2,995,969 | 8/1961 | Kraus et al. | 24/211 R |
| 3,112,547 | 12/1963 | Poe | 411/360 |
| 3,125,922 | 3/1964 | Sauter | 24/211 R |
| 3,896,698 | 7/1975 | Aylott | 24/217 |

Primary Examiner—Gene Mancene
Assistant Examiner—John Weiss
Attorney, Agent, or Firm—Gausewitz, Carr, Rothenberg & Edwards

[57] ABSTRACT

The push fastener of this invention includes a plastic receptacle held by a metal member to a workpiece, the receptacle having four leaf springs for improved alignment and load carrying ability. Two inclined inner surfaces are provided on the receptacle, one for engagement by the end of the plunger and the other for engagement by the release collar. A lip at the ends of the leaf springs is received within the interior of a washer on the end of the plunger when the fastener is secured, resisting outward displacement of the ends of the leaf springs.

18 Claims, 9 Drawing Figures

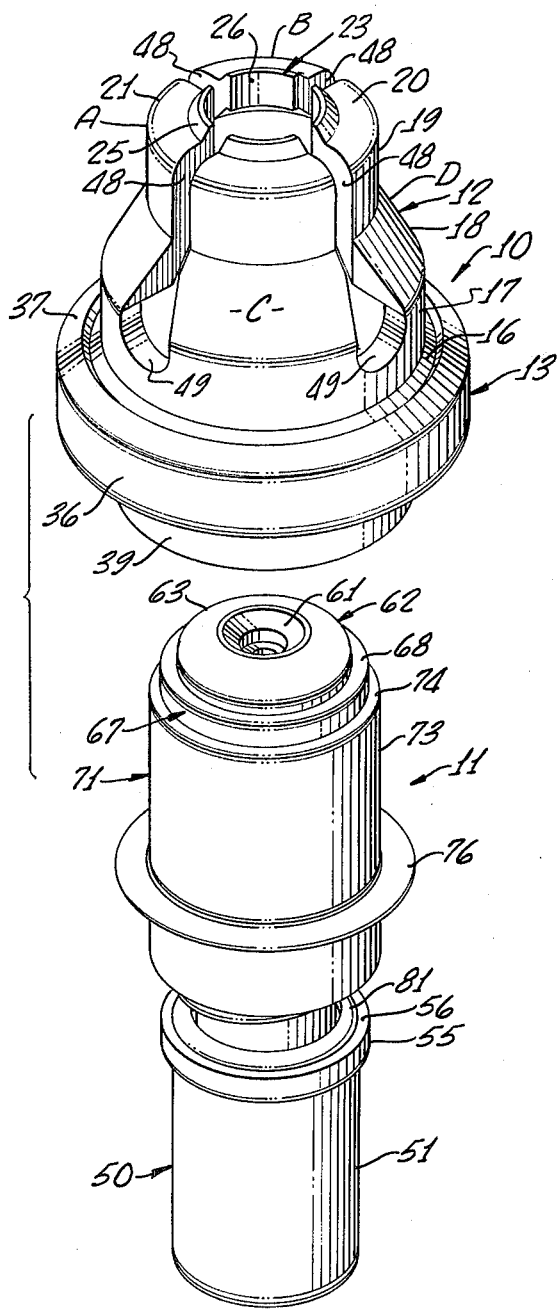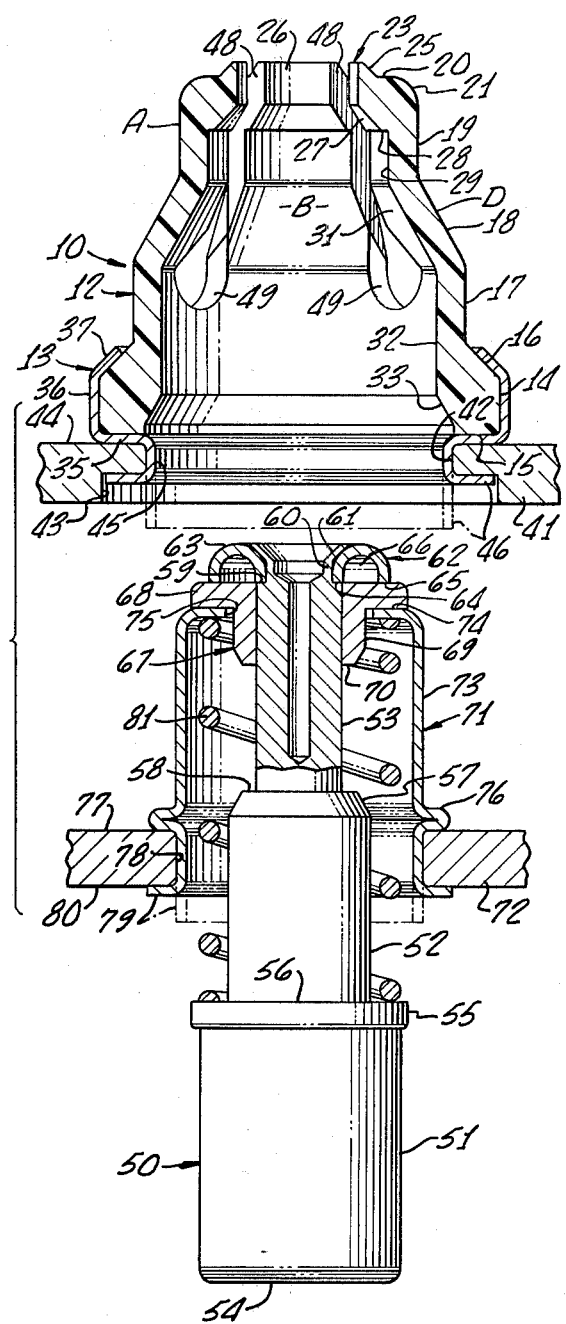
*FIG. 1.*  *FIG. 2.*

HIGH STRENGTH PUSH TYPE FASTENER

BACKGROUND OF THE INVENTION

An effective push fastener is disclosed in U.S. Pat. Nos. 2,995,969 and 3,125,922. This type of fastener is both secured and released by axial movement of a plunger, and requires no tools for its operation. Included in the fastener is a plunger having a shoulder at one end that is engaged and retained by two opposed inwardly directed leaf spring elements. These leaf spring elements are held to one of the members to be secured while the plunger is carried by a housing on the other member to be secured and is biased in one direction by a compression spring. The plunger includes a second shoulder that is engageable with a release element in the form of a disc slidable on the plunger between the two shoulders. Inward movement of the plunger moves the release disc outwardly to engage the leaf spring elements, forcing their outer ends apart and away from the plunger so that they no longer hold the plunger. The releasing disc is frictionally retained by the opposed leaf springs until the plunger is moved inwardly by the compression spring to a released position.

Although this is a very satisfactory fastener in most respects, it poses certain difficulties in manufacture and under some circumstances can cause trouble in service. It is necessary that the opposed leaf spring elements be precisely aligned and positioned for proper retention of the plunger when the fastener is in the mated condition. If they are bent out of alignment, their retention force becomes reduced. Moreover, if the leaf springs are misaligned, the release disc may be unable to deflect the outer ends apart sufficiently to release the shoulder on the plunger from the leaf springs. In that event, the fastener cannot be separated. It is quite difficult to manufacture the leaf spring elements to the necessary degree of accuracy and a substantial amount of hand work has been necessary in producing these fasteners. This slows down production and adds to the cost. Also, the spring elements, projecting from the workpiece when the fastener is in service, are vulnerable and relatively easily bent to a misaligned condition. In addition, by including only two spring prongs to support the load imposed on the fastener, its load carrying capacity has been limited.

BRIEF SUMMARY OF THE INVENTION

The present invention provides an improved push type fastener which is more rapidly and easily manufactured than prior designs, has a greater load carrying capacity and is more reliable in service.

In the fastener of this invention, the leaf spring elements are formed of plastic as portions of a hollow tubular receptacle and are symmetrically arranged in a group preferably of at least four. Plastic is readily molded to extreme accuracy and will not become bent or distorted during the service of the fastener. An appropriate plastic has a desirable amount of strength and resilience, and will not fatigue or otherwise fail after many fastening and releasing cycles.

The molded plastic receptacle has an annular ridge around its base which fits within a sheet metal element that is used in retaining the receptacle to a workpiece. The sheet metal element has a tubular portion projecting from it which is upset to provide a flange used in the retention.

A lip projects outwardly from the end of the leaf spring elements of the receptacle and the shoulder on the plunger is formed as a washer with a C-shaped cross-section that receives the lip. This provides a mechanical barrier to outward deflection of the ends of the leaf spring elements, thereby enhancing the load carrying capacity of the fastener. Unlike prior designs, the receptacle includes two inwardly inclined surfaces, one for engagement by the washer on the plunger when the fastener is mated and the other engaged by the release collar when the fastener is to be separated. This helps minimize the overall width of the fastener. The separate inclined surface for engagement by the washer on the end of the plunger, which is closer to the axis and to the outer end of the receptacle than the other inclined surface, facilitates the passage of the washer through the receptacle when the fastener is being mated, helping to enable the washer to pry the leaf springs outwardly to permit the plunger to reach the secured position. The housing for the plunger is also easily manufactured from sheet metal and has a tubular end portion that can be bent outwardly to form a flange used in securing the unit to the second workpiece.

BRIEF DESCRIPTION OF THE DRAWINGS

FIG. 1 is an exploded perspective view of the fastener of this invention in the separated condition and prior to association with the parts to be secured;

FIG. 2 is a longitudinal sectional view of the fastener in the released condition, with the components of the fastener secured to the parts that are to be attached together;

DETAILED DESCRIPTION OF THE PREFERRED EMBODIMENT

Figure 3:
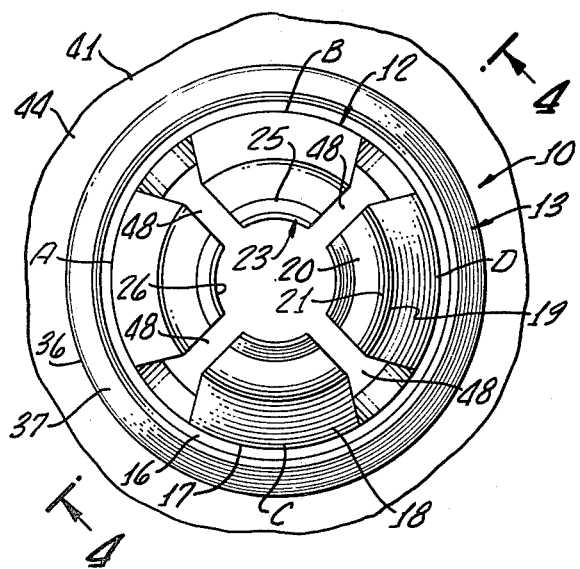
FIG. 3 is a top plan view of the receptacle portion of the fastener.

The fastener of this invention consists of two principal components, a retainer assembly 10 and a plunger assembly 11.

A hollow plastic receptacle 12 and a base member 13 of sheet metal make up the retainer assembly 10. A suitable plastic for the receptacle 12 is that marketed under the trademark "Delrin" by E. I. duPont de Nemours and Company. This material has high strength, resiliency and good fatigue resistance.

Exteriorly, a short straight cylindrical surface 14 extends inwardly from the flat bottom end 15 of the receptacle 12 and connects to a short frustoconical surface 16 which inclines radially inwardly and away from the end 15. This section of the receptacle has a relatively thick wall and defines an annular external ridge at the base of the receptacle. A straight cylindrical surface 17 is at the apical end of the surface 16, connecting to a frustoconical surface 18 that inclines toward the axis of the receptacle and away from the end 15. An additional cylindrical surface 19 is beyond the surface 18, connecting to the end 20 of the receptacle through a convexly rounded corner 21. A lip 23 projects axially outwardly from the end 20. The outer sidewall 25 of the lip 23 is frustoconical, so that the lip tapers toward its outer edge. The inner surface of lip 23 is a continuation of the cylindrical bore surface 26 at the upper end of the receptacle.

Inwardly of the receptacle is a wall 27 that connects to the end bore surface 26, being frustoconical so as to incline inwardly toward the surface 26. A narrow radial shoulder 28 extends outwardly from the wider end of the surface 27, connecting to a cylindrical bore surface 29. Opposite the exterior wall 18, the interior bore surface 31 has an inclination similar to that of the outer surface to provide uniform wall thickness. The interior inclined surface 31 is of larger diameter than the surface 27 adjacent the outer end of the receptacle. A cylindrical bore surface 32 connects to the surface 31 and terminates at a frustoconical surface 33 that flares outwardly toward the base end 15 of the receptacle 12.

The retainer 13 complementarily overlies the surfaces 14, 15 and 16 of the receptacle 12. Thus, it includes a radial base 35 at the end 15 of the receptacle, a cylindrical side 36 around the cylindrical surface 14 of the receptacle, and an inwardly inclined end flange 37 that extends over the frustoconical surface 16. These portions of the retainer 13 cooperate to hold the receptacle 12 to the retainer 13. A cylindrical section 39 projects away from the radially inner edge of the base 35 of the retainer.

Initially, the section 39 is cylindrical throughout its length, as seen in phantom in FIG. 2. However, it is bent radially outwardly when the receptacle is to be secured to a member to be fastened such as the member 41. An opening 42, substantially complementary to the exterior of the cylindrical part 39 of the retainer 13, is formed in the member 41 and may be provided with a counterbore 43 at one end. The receptacle 12 is held to the member 41 by extending the cylindrical end part 39 of the retainer 13 through the opening 42 and positioning its base section 35 on the flat outer surface 44 of the member 41. Then the end portion of the section 39 of the retainer 13 is bent outwardly over the radial shoulder 45 between the bore 42 and counterbore 43 to form a retaining flange 46.

Extending through the wall of the receptacle 12, from its outer end to the midportion of the wall 17, are four equally spaced axial slots 48. The outer portions of the slots 48 are of uniform width, but they increase in width at the location of the tapered surface 18, and terminate in rounded inner ends 49. The slots 48 have the effect of causing the receptacle 12 to define four leaf spring elements A, B, C and D above the base of the receptacle. The configuration of the slots 48 gives the leaf spring elements substantially uniform widths throughout their lengths.

The plunger assembly 11 includes an elongated pin or plunger 50 having exteriorly cylindrical sections 51, 52 and 53 of progressively smaller diameter extending from the outer end 54 of the pin to adjacent the opposite end. A ridge 55 is slightly larger in diameter than the section 51 and is located at the inner end of that section.

A radial shoulder 56 interconnects the ridge 55 and the cylindrical surface 52.

At the intermediate portion of the pin 50, a beveled edge 57 connects to the end of the cylindrical section 52 and a radial shoulder 58 at the base of the cylindrical section 53.

At the outer end of the section 53 of the pin 50 is a narrow radial shoulder 59. This area of the pin is hollow and includes a short cylindrical section 60 beyond the shoulder 59, and an outwardly flared flange 61 at the end of the pin. A washer 62 is carried by the end of the pin and engaged by the surfaces 59, 60 and 61. The washer 62 is of sheet metal with a C-shaped cross section. As a result, the washer has a convexly rounded exterior surface 63, inner and outer annular edges 64 and 65, respectively, and a hollow interior 66. The outer diameter of the washer 62 is substantially the same as the interior of the receptacle 12 at the cylindrical surface 29. The inner edge 64 of the washer 62 bears against the shoulder 59 while the flange 61 overlies the curved outer surface 63 of the washer, thereby retaining the washer 62 to the pin 50.

Circumscribing the section 53 of the pin is a collar 67 which is slidable between the washer 62 and the radial shoulder 58 at the end of the beveled edge 57. The collar 67 includes a flat radial head 68, a cylindrical intermediate section 69, and a beveled corner connecting to a radial end surface 70.

A portion of the pin 50 fits within a housing 71 which is used in securing the plunger assembly 11 to the second member to be attached by the fastener, such as a panel 72. The housing includes a cylindrical tubular section 73 with an inwardly bent end wall 74 having an opening 75 large enough to receive the cylindrical intermediate portion 69 of the collar 74. However, the opening 75 is smaller than the head 68 of the collar.

A portion of the wall of the cylindrical section 73 of the housing 70 is collapsed to a doubled-over configuration so as to provide an outwardly projecting annular flange 76. This is brought to bear against one flat surface 77 of the panel 72 as the end of the cylindrical section 73 is extended through an opening 78 in the panel 72. The outer end of the cylindrical section 73 of the housing 71 then is bent outwardly to form a radial flange 79 that overlaps the opposite flat surface 80 of the panel 72, cooperating with the flange 76 to hold the housing 71, and hence the plunger assembly 11, to the panel.

One end of a compression spring 81 bears against the inner surface of the end wall 74 of the housing 71 while the opposite end of this spring engages the radial shoulder 56 of the pin. This biases the pin 50 outwardly of the housing 71 so that in the released position of the fastener, shown in FIG. 2, the outer annular edge 65 of the washer 62 is caused to press the head 68 of the collar 67 against the outer surface of the housing end wall 74.

Figure 4:
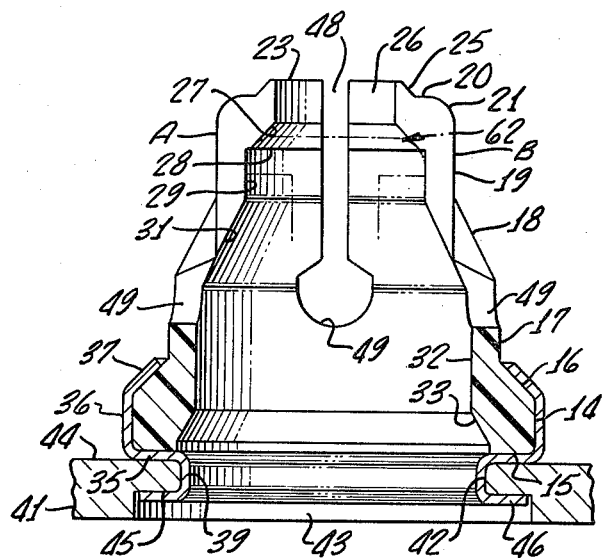
FIG. 4 is a longitudinal sectional view taken along line 4—4 of FIG. 3.
Figure 5:
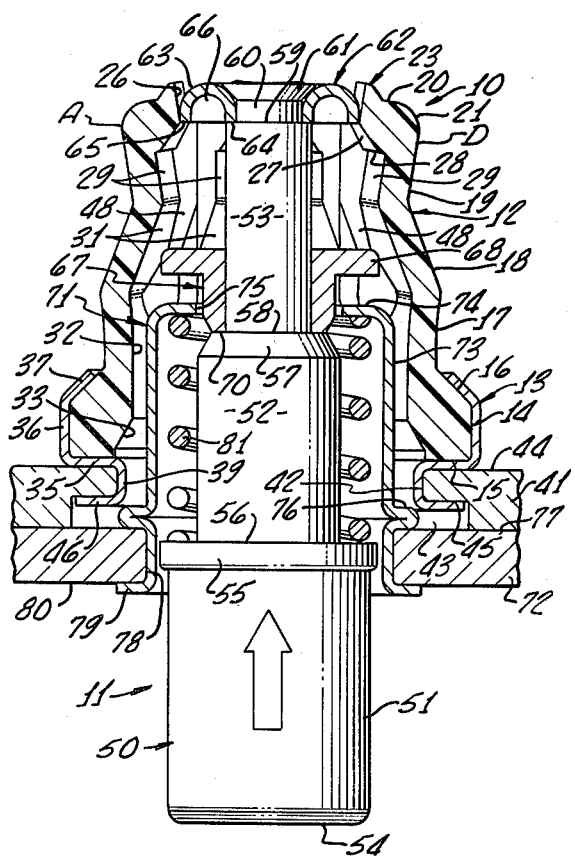
FIG. 5 is a longitudinal sectional view of the fastener as it is being moved from the released to the secured position.
Figure 6:
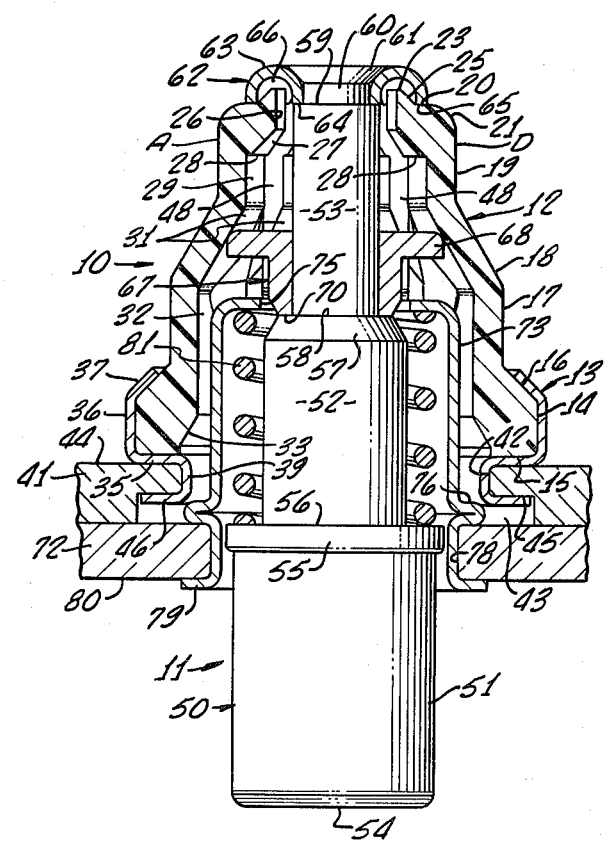
FIG. 6 is a longitudinal sectional view of the fastener in the secured position.

When the members 41 and 72 are to be attached, they are brought together, as shown in FIG. 5, with the housing 71 of the plunger assembly 11 entering the receptacle 12. Then the pin 51 is pressed inwardly against the bias of the spring 81. This moves the washer 62 through the cylindrical bore 29 and brings the washer's rounded outer surface 63 to bear against the inwardly inclined surface 27 at the end portion of the receptacle. This produces an outward reaction on the leaf spring elements A, B, C and D so that they are spread apart by the washer. Because the receptacle includes the inclined surface 27 beyond the radial shoulder 28, and the outer surface 63 of the washer 62 is convexly rounded, the washer engages the inclined surface 27, but not the shoulder 28. This effect is illustrated in phantom in FIG. 4. As a result, the washer 62 easily deflects the leaf springs A, B, C and D outwardly as it is moved axially with a relatively light force.

With continued movement of the pin 50, the washer 62 enters the cylindrical end part 26 of the bore of the receptacle, as shown in FIG. 5, as the leaf spring elements A, B, C and D are deflected. Further movement of the pin 50 then brings the washer 62 above the lip 23 at the end of the receptacle, which allows the leaf spring elements to snap inwardly to their original free positions. When the pin 50 then is released, the compression spring 81 forces the washer 62 downwardly against the end surface 20 of the receptacle with the lip 23 of the receptacle received within the hollow interior 66 of the washer between the inner and outer annular edges 64 and 65. As a result, the members 41 and 72 are held together as the force of the compression spring 81 holds the outer edge 65 of the washer 62 of the plunger assembly tightly against the end wall 20 of the receptacle. The inclined outer wall 25 of the lip 23 helps center the washer 62 with respect to the receptacle 12 as the washer edge 65 is brought to bear against the end surface 20.

By the provision of four leaf spring elements formed by the receptacle, support is provided all around the periphery of the washer 62 so that the washer will be securely held at the end of the receptacle and relatively high loads can be absorbed. The stable support for the washer 62 helps assure that the pin 50 and receptacle 12 do not tilt relative to each other. Outward displacement of the leaf spring elements of the receptacle is resisted effectively because of the presence of the lip 23 which forms an abutment within the interior 66 of the C-shaped cross-section of the washer 62. This results in a mechanical lock at the outer washer edge 65 that holds the ends of the leaf spring elements A, B, C and D inwardly adjacent the pin 50 so that the engagement between the washer and the leaf spring elements is maintained and the fastener will not fail prematurely under load.

Figure 7:
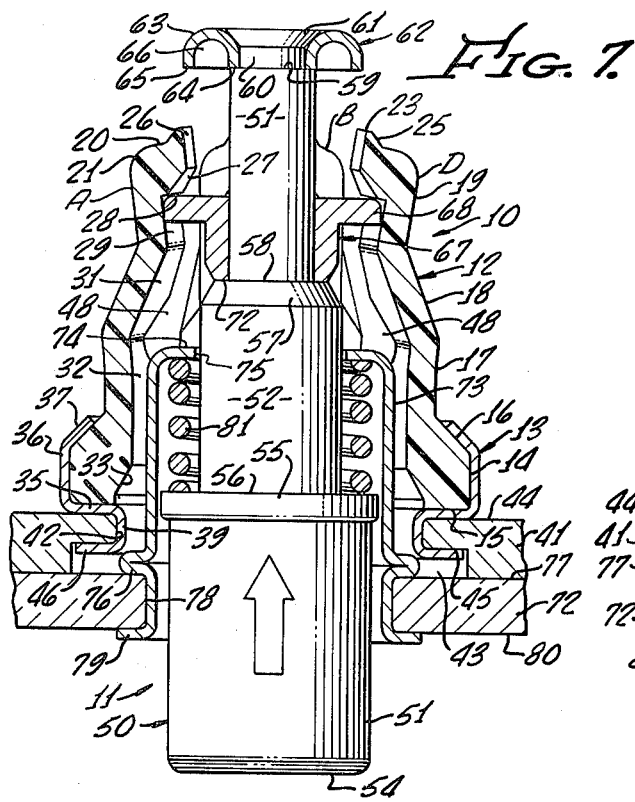
FIG. 7 is a longitudinal sectional view of the fastener illustrating the first increment of movement in the release of the fastener.
Figure 8:
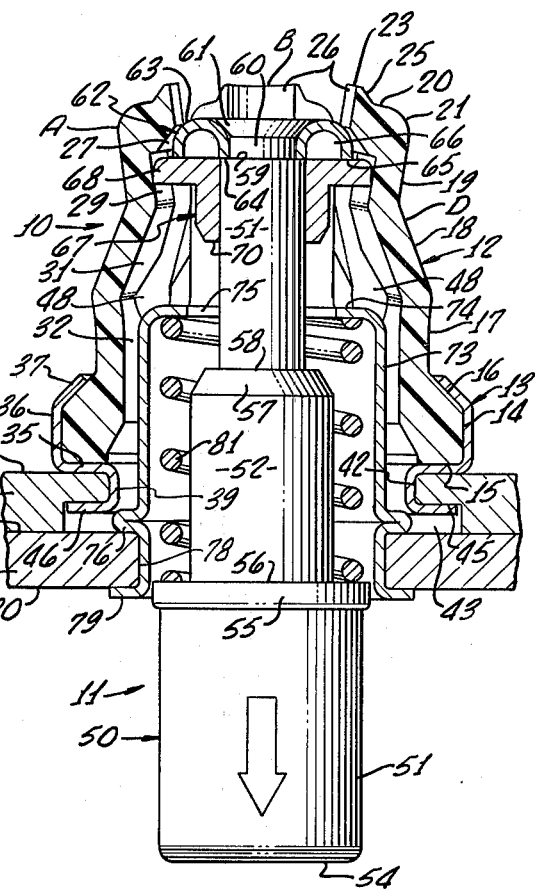
FIG. 8 is a view similar to FIG. 7, showing subsequent movement of the components in the release of the fastener.
Figure 9:
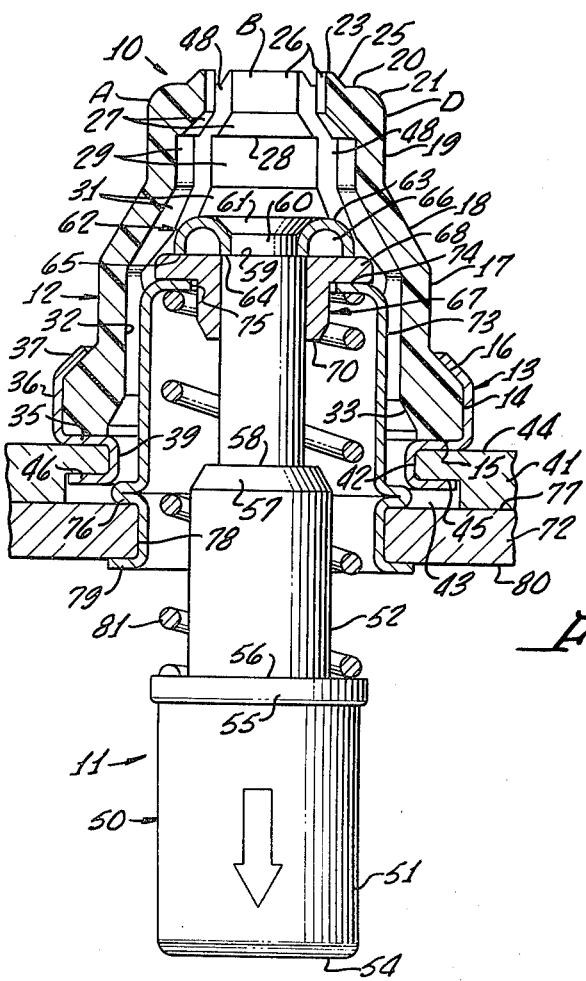
FIG. 9 is a view similar to FIGS. 6, 7 and 8, with the fastener fully released.

Release of the fastener is illustrated in FIGS. 7, 8 and 9. The pin 50 is pressed inwardly causing its shoulder 58 to move the collar 67 with it. The leaf spring elements A, B, C and D are pried outwardly as the head 68 of the collar 67 reacts against the inclined surfaces 31 of the receptacle while it is axially advanced. Ultimately, the collar reaches the position of FIG. 7 in which the head 68 engages the bore surfaces 29 and the leaf spring elements are held apart. Further axial movement of the collar 67 is arrested by engagement of the head 68 of the collar with the radial shoulder 28 of the receptacle. In this position, the washer 62 is free of the lip 23 and the end wall 20 of the receptacle.

The pin 51 then is released, allowing the spring 81 to shift it to the position of FIG. 8, bringing the washer 62 down inside the receptacle. This is made possible because the collar 67, frictionally held in position with its head 68 within the bore 29, holds the leaf spring elements apart, so that the opening at the end bore 26 is sufficiently wide to allow the washer 62 to enter.

Further movement of the pin 50 in response to the bias of the spring 81, as indicated in FIG. 9, causes the washer 62 to engage the head 68 of the collar 67 to bring the collar back to engagement with the end wall 74 of the housing 71. The leaf spring elements A, B, C and D then are released by the collar and are free to return to their normal positions. The members 41 and 72 then no longer are held together and may be separated as indicated in FIG. 2.

The foregoing detailed description is to be clearly understood as given by way of illustration and example only, the spirit and scope of this invention being limited solely by the appended claims.

I claim:
1. A fastener comprising:
   a housing member attached to a first workpiece,
   a plunger reciprocative relative to said housing member, said plunger including a first shoulder means at one end thereof and a second shoulder means inwardly of said one end,
   a receptacle means, said receptacle means including
      a plastic member having a base portion, and a plurality of integral leaf springs projecting in one direction from said base portion,
      and a metal member for securing said plastic member to a second workpiece,
         said leaf springs having outer end portions engaged by said first shoulder means of said plunger,
   resilient means biasing said plunger in a direction such that said first shoulder means is held in engagement with said end portions of said leaf springs,
      said leaf springs including abutments extending outwardly from said end portions thereof, said first shoulder means including a portion radially outwardly of said abutments for providing a mechanical lock to resist outward deflection of said leaf springs,
   and a release member on said plunger intermediate said first and second shoulder means,
      said release member being movable by said second shoulder means upon movement of said plunger in opposition to said resilient means for prying apart said leaf springs for releasing said first shoulder means from said end portions of said leaf springs.

2. A device as recited in claim 1, in which said first shoulder means is defined by a member having a substantially C-shaped cross section.

3. A device as recited in claim 1 in which said leaf springs collectively define a hollow element, and said abutments collectively define an annular lip at the end of said hollow element.

4. A device as recited in claim 3 in which said portion of said first shoulder means is an annular element radially outward of said annular lip, said annular element having an edge engaging said end portions of said leaf springs.

5. A device as recited in claim 4 in which said annular lip has an outer surface adjacent said annular element which inclines axially outwardly and radially inwardly with respect to said hollow element.

6. A device as recited in claim 3 in which said leaf springs include first interior surfaces adjacent and spaced inwardly from the outer ends thereof, second interior surfaces spaced inwardly from said first interior surfaces, said first and second interior surfaces being inclined toward the axis of said hollow element and toward said outer ends of said leaf springs, said second interior surfaces being engageable by said release member when said release member is so moved by said second shoulder means, and third interior surfaces intermediate said first and second interior surfaces for limiting the travel of said release member so as to preclude engagement of said release member with said first interior surfaces.

7. A device as recited in claim 6 in which said first shoulder means is dimensioned to move axially past said second and third interior surfaces without causing substantial deflection of said leaf springs, and to engage said first interior surfaces and cause deflection of said leaf springs upon the mating of said fastener.

8. A device as recited in claim 6 in which said third interior surfaces include portions collectively defining a cylindrical surface for frictionally gripping said release member.

9. A device as recited in claim 8 in which said third interior surfaces include radial abutment surfaces interconnecting the outer ends of said cylindrical surfaces and said first interior surfaces for engagement by said release member for so limiting the travel thereof.

10. A fastener comprising:
a housing member attachable to a first workpiece,
a plunger reciprocative relative to said housing member, said plunger including a first shoulder means at one end thereof and a second shoulder means inwardly of said one end,
a receptacle means, said receptacle means including a base portion,
a plurality of integral leaf springs projecting in one direction from said base portion,
and means for securing said base portion to a second workpiece,
said leaf springs having outer end portions engaged by said first shoulder means of said plunger, said outer end portions of said leaf springs defining first generally radially directed surfaces, and second surfaces extending axially outwardly from said first surfaces, said first shoulder means including a surface radially outwardly of said second surfaces of said leaf springs for preventing radially outward displacement of said outer end portions of said leaf springs,
resilient means biasing said plunger in a direction such that said first shoulder means is held in engagement with said end portions of said leaf springs,
and a release member on said plunger intermediate said first and second shoulder means,
said release member being movable by said second shoulder means upon movement of said plunger in opposition to said resilient means for prying apart said leaf springs for releasing said first shoulder means from said outer end portions of said leaf springs.

11. A device as recited in claim 10 in which there are at least four of said leaf springs with their adjacent edges in juxtaposition.

12. A device as recited in claim 11 in which said leaf springs are of substantially uniform widths throughout the lengths thereof.

13. A device as recited in claim 10 in which said first surfaces of said outer end portions of said leaf springs are radially outwardly of said second surfaces thereof, said first shoulder means including a surface engaging said first surfaces of said outer end portions of said leaf springs.

14. A device as recited in claim 13 in which said second surfaces of said leaf springs are inclined toward the outer ends of said leaf spring springs.

15. A device as recited in claim 10 in which said first shoulder means is defined by a washer having a generally C-shaped cross section so as to provide inner and outer annular edges and a hollow interior, said first surfaces of said outer end portions of said leaf springs being engaged by said outer annular edge, said second surfaces of said outer end portions of said leaf springs being received in said hollow interior of said washer.

16. A device as recited in claim 10 in which
said release member is annular and slidable relative to said plunger,
each of said leaf springs including two spaced interior surfaces inclining inwardly toward the interior of said receptacle means and toward said outer end portions of said leaf springs,
one of said interior surfaces being adjacent said outer end portions and the other remote therefrom,
said one interior surface being closer to the longitudinal axis of said receptacle means than said other interior surface, and engageable by said first shoulder means when said plunger is advanced into said receptacle means for deflecting said leaf springs outwardly and moving said first shoulder means of said plunger to its position of engagement with said outer end portions of said leaf springs,
said other interior surface being engageable by said release member when said release member is so moved by said plunger for deflecting said leaf springs outwardly and releasing said first shoulder means from said outer end portions of said leaf springs,
said first shoulder means being dimensioned to pass said other interior surface without causing substantial deflection of said leaf springs when said first shoulder means is so advanced,
each of said leaf springs including an intermediate interior surface between said inclined interior surfaces for engaging and frictionally retaining said release member when said first shoulder means has been so released from said outer end portions of said leaf springs.

17. A device as recited in claim 16 in which said leaf springs define an abutment between said intermediate surfaces and said one interior surfaces for limiting the movement of said release member toward said outer end portions.

18. A device as recited in claim 16 in which
said first shoulder means is an annular element having a convexly rounded outwardly facing surface,
and said abutment is a generally radial surface,
said convexly rounded surface being of greater diameter than the inner part of said generally radial surface, but remote from said generally radial surface when said plunger is so advanced into said receptacle.

* * * * *